US011641307B2

(12) United States Patent
Boucadair et al.

(10) Patent No.: US 11,641,307 B2
(45) Date of Patent: May 2, 2023

(54) METHOD FOR CONFIGURING A NETWORK NODE

(71) Applicant: Orange, Paris (FR)

(72) Inventors: Mohamed Boucadair, Châtillon (FR); Christian Jacquenet, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/311,092

(22) PCT Filed: Dec. 3, 2019

(86) PCT No.: PCT/FR2019/052901
§ 371 (c)(1),
(2) Date: Jun. 4, 2021

(87) PCT Pub. No.: WO2020/115422
PCT Pub. Date: Jun. 11, 2020

(65) Prior Publication Data
US 2021/0336849 A1    Oct. 28, 2021

(30) Foreign Application Priority Data
Dec. 7, 2018   (FR) .................................. 1872545

(51) Int. Cl.
G06F 15/16    (2006.01)
H04L 41/0816    (2022.01)
(Continued)

(52) U.S. Cl.
CPC ...... H04L 41/0816 (2013.01); H04L 41/0836 (2013.01); H04L 41/0886 (2013.01); H04L 45/028 (2013.01); H04L 45/42 (2013.01)

(58) Field of Classification Search
CPC ............. H04L 41/0816; H04L 41/0836; H04L 41/0886; H04L 45/028; H04L 45/42
(Continued)

(56) References Cited

U.S. PATENT DOCUMENTS 8,989,046 B1 *   3/2015   Train ...................... H04L 45/02
                                                              370/254
2010/0265956 A1   10/2010   Li
(Continued)

FOREIGN PATENT DOCUMENTS

WO    WO 2013/182248 A1    12/2013

OTHER PUBLICATIONS

International Search Report and Written Opinion dated Mar. 6, 2020 for Application No. PCT/FR2019/052901.
(Continued)

*Primary Examiner* — Karen C Tang
(74) *Attorney, Agent, or Firm* — Knobbe, Martens, Olson & Bear, LLP

(57) ABSTRACT

A method for configuring a first network node using a first autonomous system (AS) number in at least one session established with another node according to a dynamic routing protocol is described. The method is implemented by the first node and includes receiving a configuration message comprising at least one piece of information that is representative of a second AS number intended to be used by the first node as a replacement for the first number, configuring the first node with the second AS number, identifying at least one second node having at least one session according to the dynamic routing protocol, active with the first node, in which the first node is associated with the first AS number, and sending a control message to the at least one second node requesting the replacement of the first AS number with the second AS number by the at least one second node, such that, after the replacement, the first node is associated with the second AS number in the at least one active session.

16 Claims, 9 Drawing Sheets

(51) Int. Cl.
_H04L 41/0823_ (2022.01)
_H04L 41/08_ (2022.01)
_H04L 45/028_ (2022.01)
_H04L 45/42_ (2022.01)
_G06F 15/173_ (2006.01)

(58) Field of Classification Search
USPC .................................................. 709/231, 220
See application file for complete search history.

(56) References Cited

U.S. PATENT DOCUMENTS

| 2014/0181292 | A1  | 6/2014  | Venkatawami et al. |         |
|--------------|-----|---------|--------------------|---------|
| 2016/0241457 | A1* | 8/2016  | Semwal             | H04L 45/02 |
| 2016/0352619 | A1* | 12/2016 | Gattani            | H04L 45/745 |

OTHER PUBLICATIONS

Yuncheng Zhu et al. "Potential Impacts of Four-Byte AS Numbers in Partial Deployment" Networks, 2007. ICON 2007. 15th IEEE International Conference on, IEEE, PI, Nov. 1, 2007 (Nov. 1, 2007), pp. 212-217.

* cited by examiner

[Fig. 1]
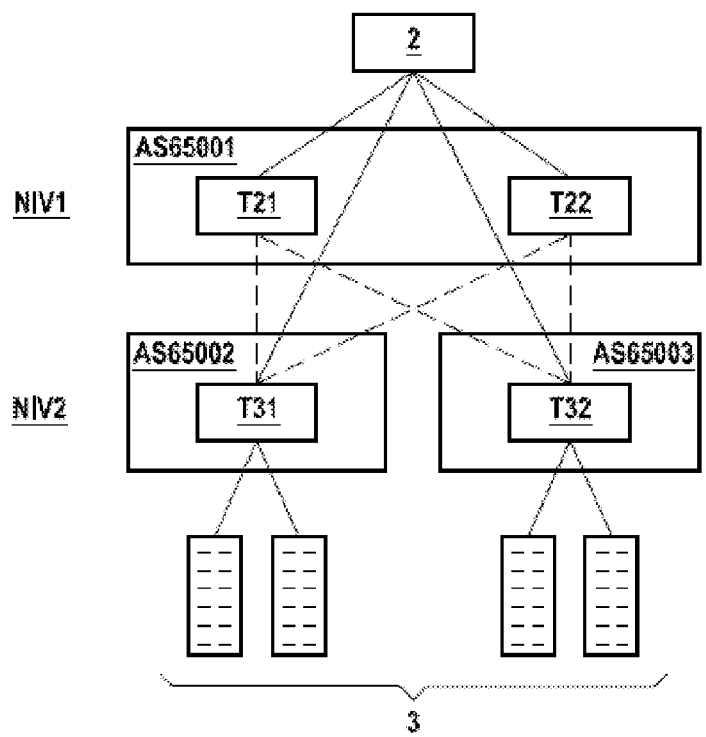
[Fig. 2]
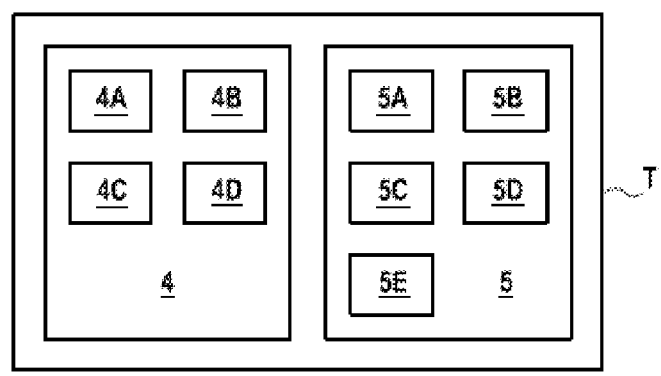

[Fig. 3]
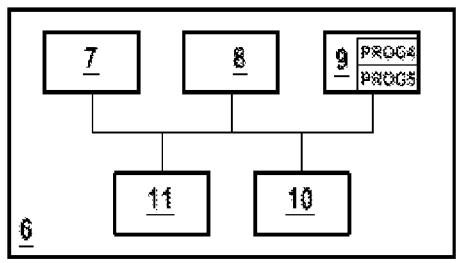
[Fig. 4]
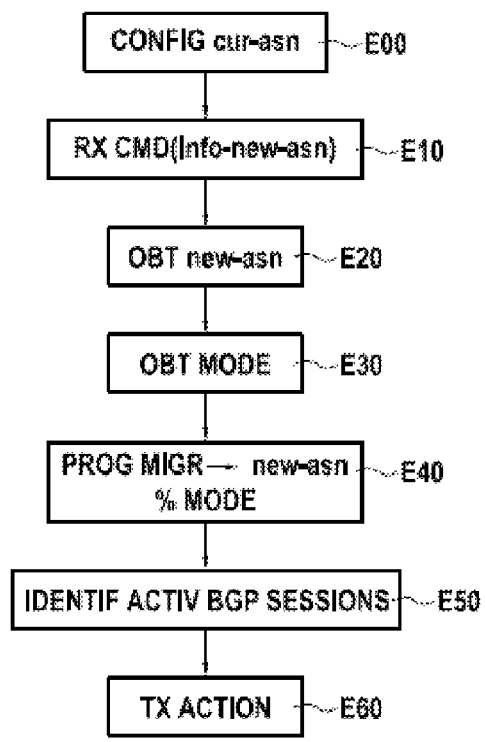

[Fig. 5A]
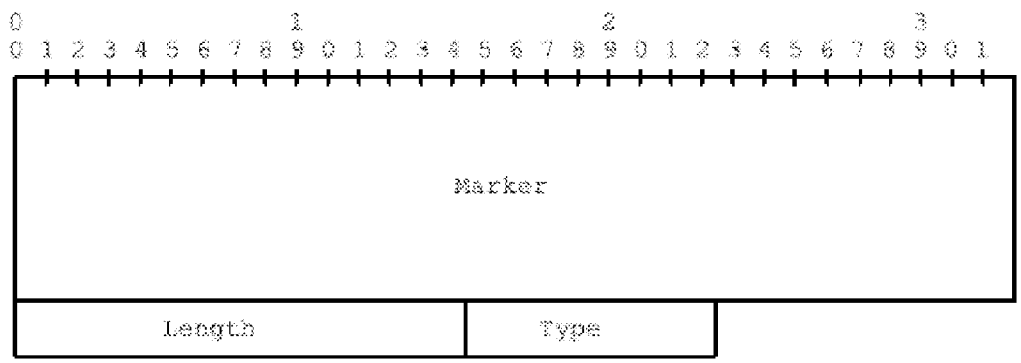
[Fig. 5B]
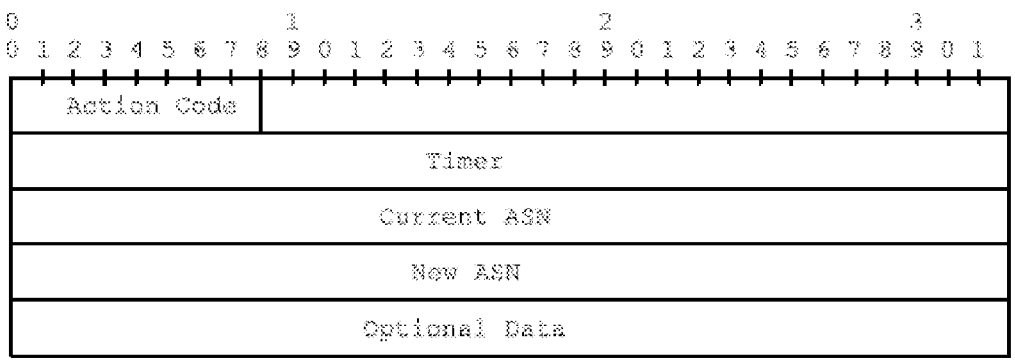
[Fig. 5C]
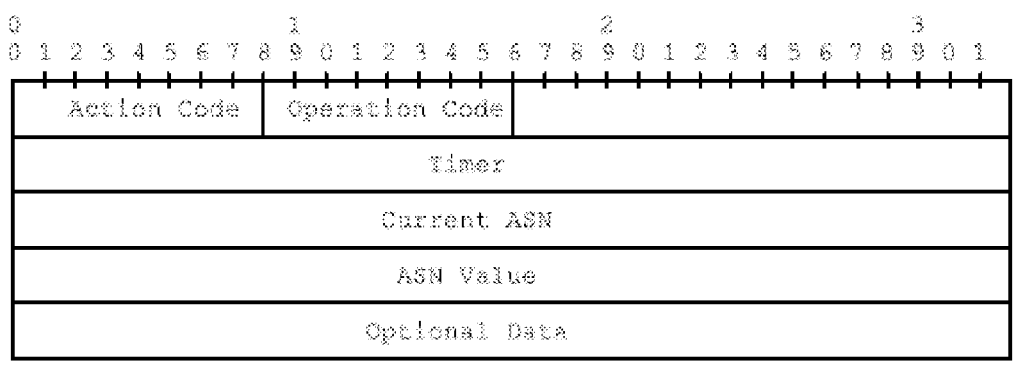

[Fig. 6]
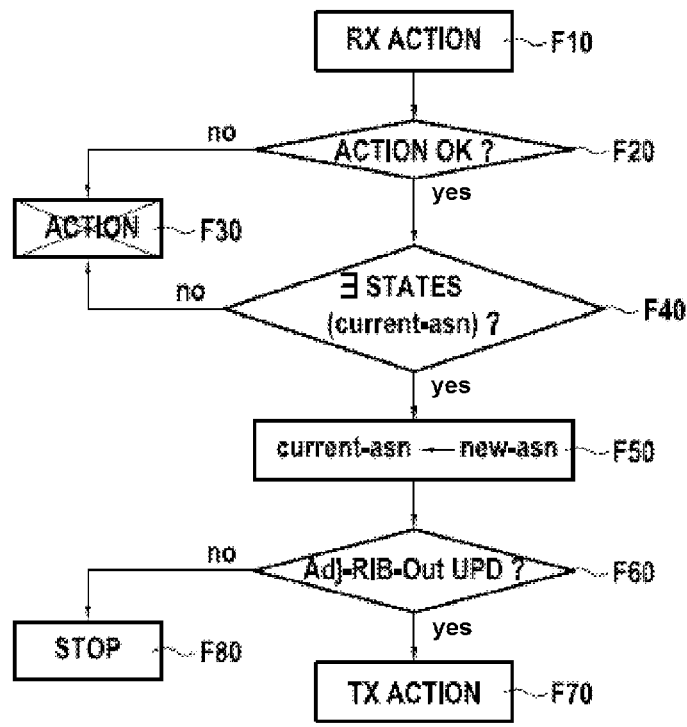
[Fig. 7A]
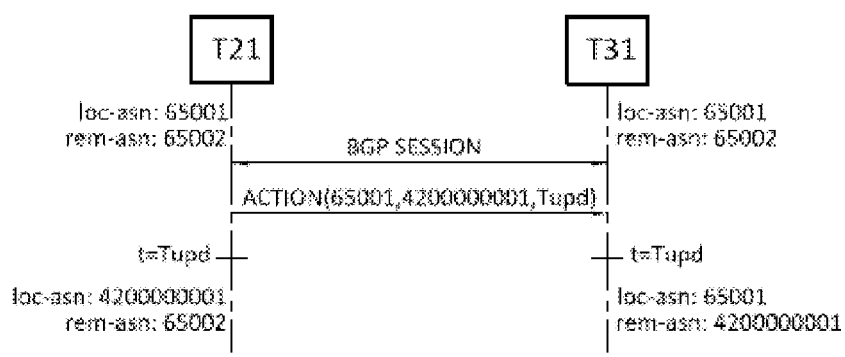

[Fig. 7B]

| Network | Next Hop | Path | ..... |
|---|---|---|---|
| *> 1.0.0.0/8 | a.b.c.d | 65001 | ..... |
| *> 1.0.0.0/8 | a.b.c.d | 65001 | ..... |

[Fig. 7C]

| Network | Next Hop | Path | ..... |
|---|---|---|---|
| *> 1.0.0.0/8 | a.b.c.d | 4500000001 | ..... |
| *> 1.0.0.0/8 | a.b.c.d | 4200000001 | ..... |

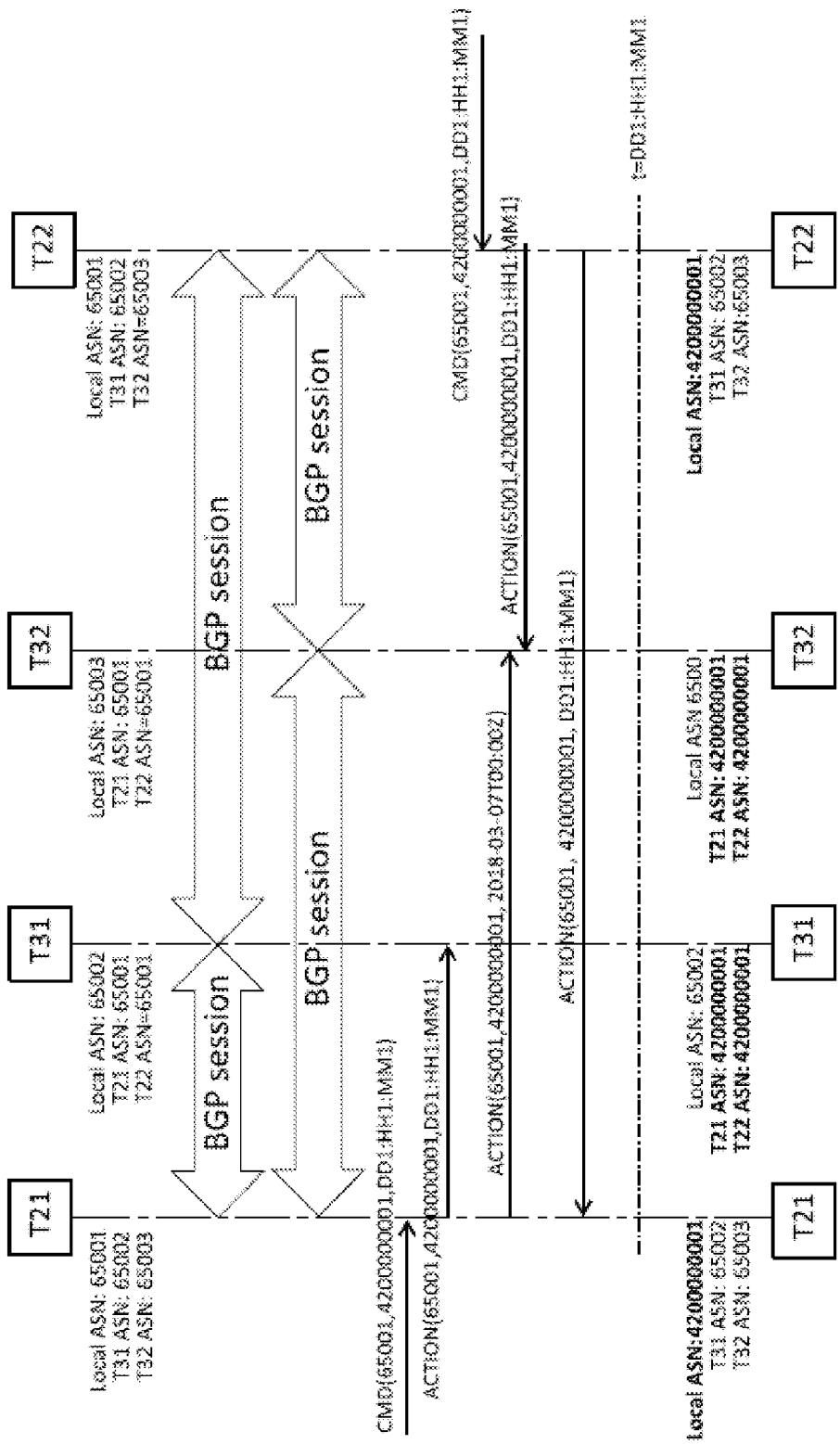
[Fig. 8A]

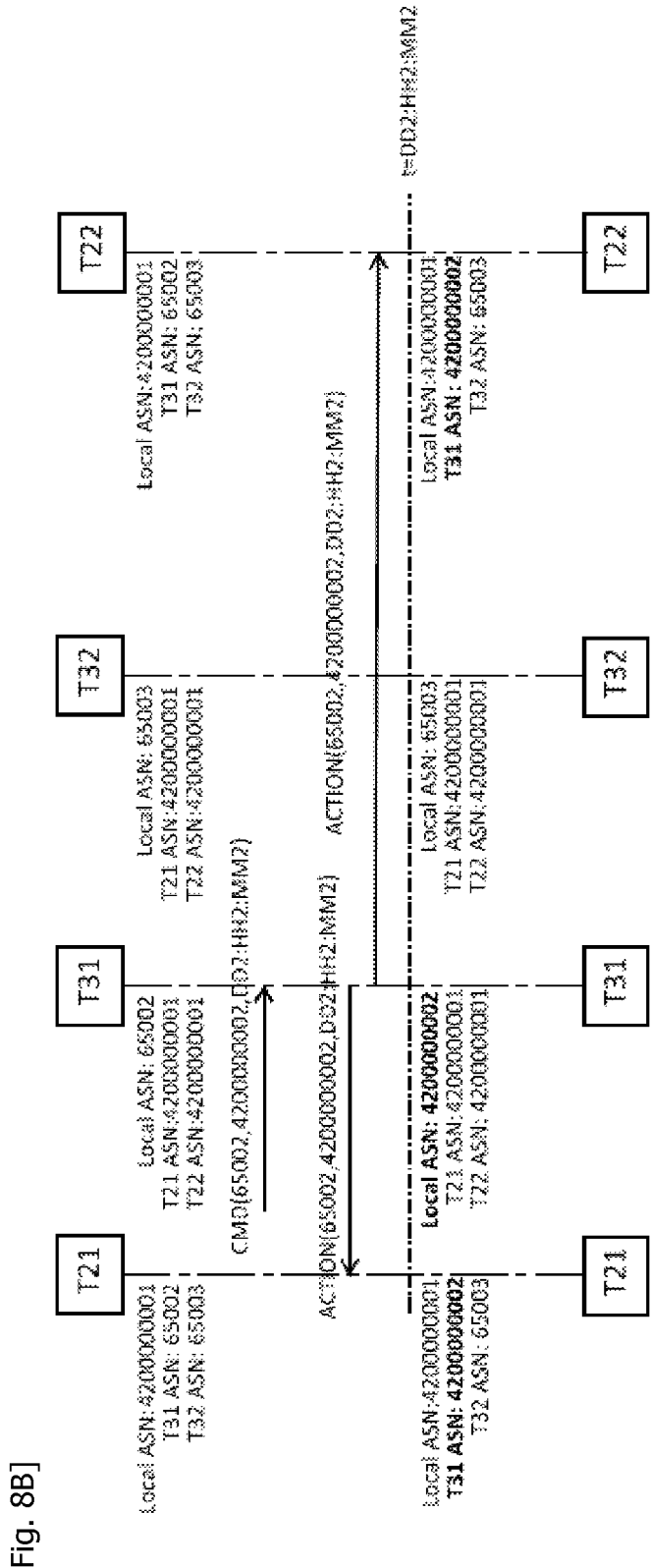

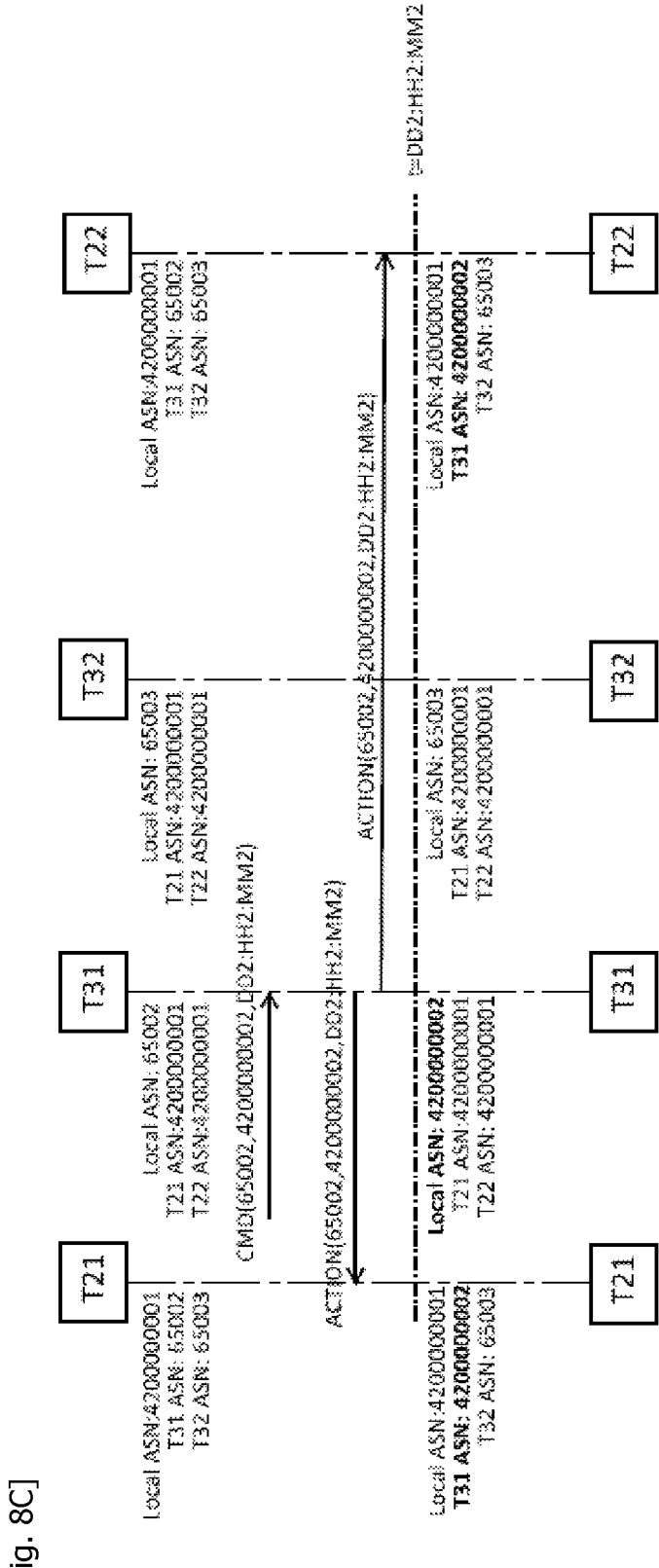

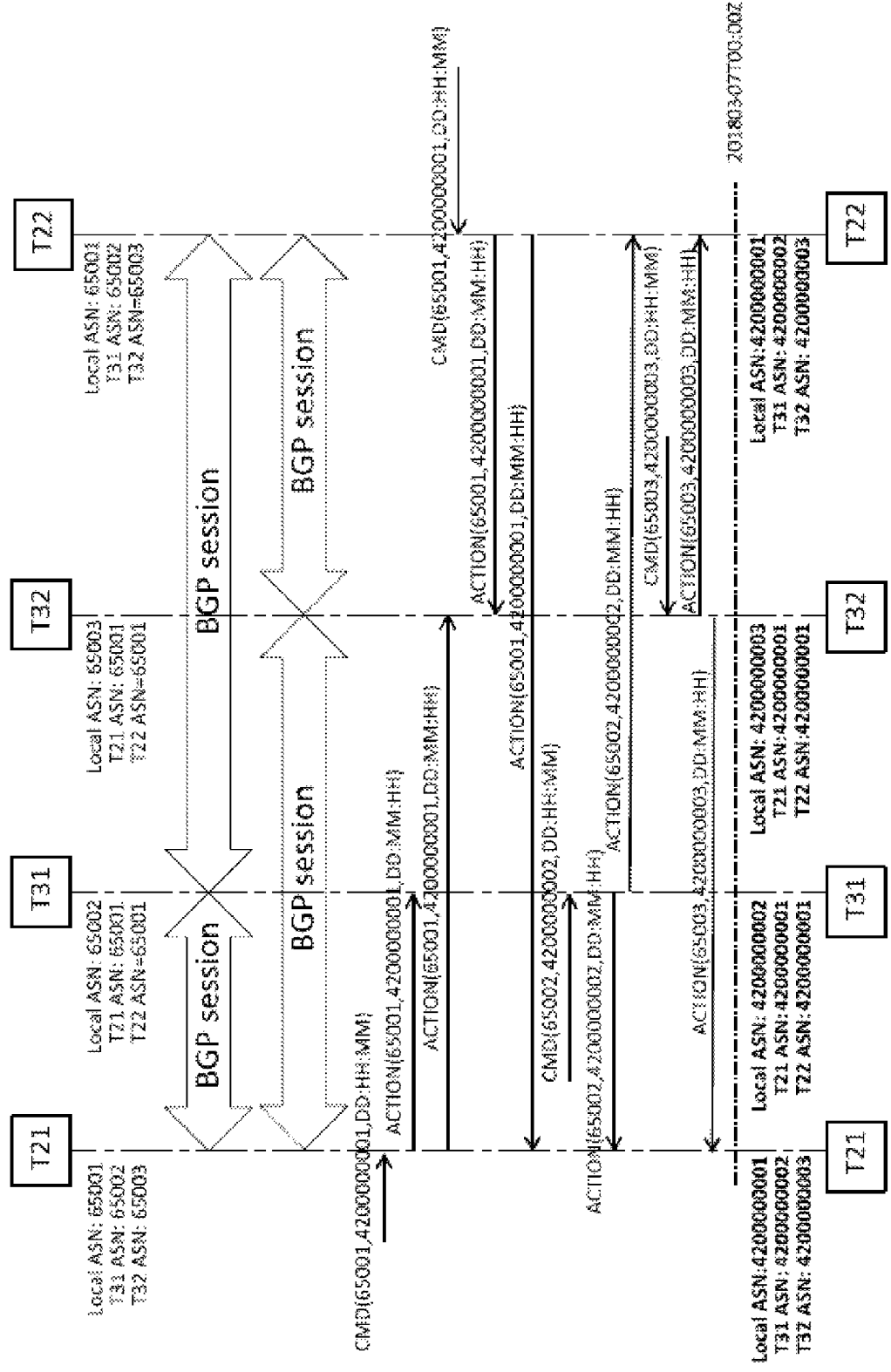

METHOD FOR CONFIGURING A NETWORK NODE

RELATED APPLICATIONS

This application is the U.S. National Phase of Application No. PCT/FR2019/052901 entitled "METHOD FOR CONFIGURING A NETWORK NODE" and filed Dec. 3, 2019, which claims the benefit of French Patent Application No. 1872545, filed Dec. 7, 2018, each of which is incorporated by reference in its entirety.

PRIOR ART

The invention relates to the general field of telecommunications.

It more specifically concerns the configuration of devices of a telecommunications network implementing a dynamic routing protocol, such as the BGP (Border Gateway Protocol) or its secure version BGPsec, or else the TRIP (Telephony Routing over IP) protocol, for computing, selecting, and setting up routes intended to direct the traffic through the network.

Such routing protocols are currently used in telecommunications networks to communicate routing information between different autonomous systems (AS). The Internet network comprises several tens of thousands of autonomous systems, each operated by a specific administrative entity, called the network operator or administrator. Each autonomous system visible on the Internet is identified by a globally unique number known as the autonomous system number or AS number (ASN).

The BGP protocol is also used for intra-operator requirements, for example for exchanging routes between access infrastructures and network core infrastructures.

At the present time it is also increasingly used in network infrastructures (also more simply referred to as "networks") on which Data Centers (DC) rely, and in particular large-scale data centers, also known as MSDC (Massively Scalable Data Centers) or HSDC (Hyper-Scale Data Centers). The BGP protocol makes it possible within these network infrastructures to exchange routing information between the different items of network equipment (for example routers, controllers, or switches). The network infrastructure of a data center may constitute an autonomous system in its own right or be organized into a set of autonomous systems, which can for example form a "BGP confederation" when the infrastructure is massively distributed. Within such a network infrastructure, private AS numbers, i.e. AS numbers not visible from the Internet, are often used to facilitate the management of the BGP routing policy without having to request the assigning of a globally unique AS number. This makes it possible to more easily distinguish the network infrastructure of the data center strictly speaking, from the network to which this infrastructure is connected and to which a separate AS number is assigned. Within the network infrastructure of the data center, a same AS number can for example be used by several routers located on one and the same hierarchical level. Also, BGP extensions specific to the data centers (for ex. "allowas-in") have been developed by some manufacturers to be able to use one and the same AS number in the different hierarchical levels of a DC.

In order to simplify the configuration procedures of the network infrastructure equipment of a data center and minimize the risk of configuration errors in particular, the deployment of this data center requires a high level of automation of the resource production processes (for example the dynamic production of virtual machines intended to host certain virtual network functions). Such an automation also makes it possible to improve the availability and stability of the network: any modification of the network infrastructure topology related to the introduction of new switching resources (for example switches, routers) or transmission resources (for example intra- and inter-data centers intended to provide more capacity to allow more traffic to flow) must be done in a dynamic manner requiring a minimal, or even zero, configuration effort.

In addition, it is important to control the volumetrics of the signaling traffic, composed in particular of the items of configuration information issued within the network infrastructure, typically by one or more network controllers when the data center is based on an architecture of SDN (Software-Defined Networking) type, for example. This signaling traffic can also comprise notifications issued by certain items of network equipment when they detect a modification of its topology, for example the breaking of a connection between two switches located within one and the same data center. It is imperative to ensure that the volumetrics of the exchanged signaling traffic in no way penalizes the availability of the service or services that would involve resources hosted within the infrastructure of the data center.

In order to optimize the exploitation of resources within a data center, the configuration of the equipment items of the underlying network (also called "nodes" in the remainder of the description) must comply with suitable procedures for naming the interfaces, addresses or prefixes allocated to these interfaces, etc. In particular, the installation of a routing policy within the network infrastructure of the data center according to a routing protocol such as BGP or BGPsec, is based on the setting-up of BGP sessions between the different nodes of the network. These sessions are set up on the basis of different items of configuration information and particularly the AS number to which each node belongs: the AS number is a compulsory item of information to be able to set up a BGP session between two routers. Specifically, if a BGP node such as a router does not know the number of the autonomous system to which it belongs, it is incapable of setting up a BGP session with another router belonging to a neighboring autonomous system, but also with the other routers of the autonomous system to which it belongs. However, the setting-up of BGP sessions between all the nodes of an autonomous system is imperative to guarantee a global and consistent vision of the network infrastructure topology; the AS number is a precondition for the setting-up of these sessions. It should moreover be noted that this AS number is also used to select BGP routes and for the detection and prevention of routing loops within the network infrastructure.

The exploitation of a data center requires the dynamic and flexible structuring of the autonomous systems composing it: for example, nodes can be grouped to form one and the same autonomous system, an autonomous system can be split into several groups or clusters each associated with a different AS number, the operator of the data center may consider migrating the AS numbers used within its infrastructure to a new format (for example a format encoded on 2 octets to a format encoded on 4 octets), etc. These operations manifest as changes (in other words, migrations) of the AS numbers associated with certain nodes from the data center to other AS numbers used as replacements for the first ones.

In the current prior art, no mechanism exists allowing the migration of one or more AS numbers within a network without causing an interruption of service (and particularly, without breaking off the BGP sessions associated with the former AS numbers). The migration of AS numbers is specifically managed at present by reinitializing (and therefore by interrupting) the active BGP sessions associated with the AS numbers which are modified and by putting in place, for example, traffic engineering policies which make it possible to circumvent the nodes affected by the modifications of AS numbers. It should be noted that the deletion of routes (ahead of the modification of an AS number) then the announcement of the routes (after modification of the AS number) furthermore have a negative impact on the stability of the BGP routing within the network because of the command messages required to update the routing tables.

The drawbacks that have just been described for the BGP routing protocol also apply to other dynamic routing protocols such as BGPsec or TRIP in particular.

SUBJECT AND SUMMARY OF THE INVENTION

The present invention in particular makes it possible to palliate the aforementioned drawbacks by proposing a method for configuring a first network node using a first autonomous system number in at least one session set up with another network node and compliant with a dynamic routing protocol implemented in the network, this method comprising the following steps implemented by the first node:
- a step of receiving a configuration message comprising at least one item of information representing at least one second autonomous system number intended to be used by the first node as a replacement for the first autonomous system number;
- a step of configuring said first node with said at least one second autonomous system number;
- a step of identifying at least one second network node having at least one session, in accordance with said dynamic routing protocol, active with the first node, wherein the first node is associated with the first autonomous system number; and
- a step of sending, to said at least one second node, a command message requesting the replacement by said at least one second node of the first autonomous system number associated with said first node with said at least one second autonomous system number, such that after said replacement the first node is associated with a so-called second autonomous system number in said at least one active session.

Correspondingly, the invention also concerns a device of a network, the so-called first node, configured to use a first autonomous system number in at least one session set up with another network node and in accordance with a dynamic routing protocol implemented in the network, said first node comprising:
- a receiving module, able to receive a configuration message comprising at least one item of information representing at least one second autonomous system number intended to be used by the first node as a replacement for the first autonomous system number;
- a configuring module parameterized to configure the first node with said at least one second autonomous system number;
- an identifying module configured to identify at least one second network node having at least one session compliant with the active dynamic routing protocol with the first node, wherein the first node is associated with the first autonomous system number; and
- a sending module, configured to send, to said at least one second node, a command message requesting the replacement by said at least one second node of the first autonomous system number associated with said first node with said at least one second autonomous system number, such that after said replacement, the first node is associated with a said second autonomous system number in said at least one active session.

Another aim of the invention is a method for processing a command message requesting the replacement of a first autonomous system number associated with a first network node implementing a dynamic routing protocol, with at least one second autonomous system number, said processing method being implemented by a second network node and comprising:
- a step of verifying, if it exists:
- at least one active session between the first node and the second node in accordance with the dynamic routing protocol and wherein the first node is associated with the first autonomous system number; and/or
  - at least one entry associated with the first autonomous system number in at least one routing table kept by the second mode for the implementation of the dynamic routing protocol in the network;
  - if at least one active session exists, a step of replacing the first autonomous system number associated with the first node in said at least one active session with said at least one second autonomous system number; and
  - if there exists at least one entry in at least one routing table kept by the second node, a step of replacing in said at least one routing table of the first autonomous system number associated with said at least one entry with said at least one second autonomous system number.

Correspondingly, the invention also relates to a device of a network, the so-called second node, configured to process a command message requesting the replacement of a first autonomous system number associated with a first network node implementing a dynamic routing protocol, with at least one second autonomous system number, said second node comprising:
- a verifying module, configured to verify whether or not there exists:
- at least one active session between the first node and the second node in accordance with the dynamic routing protocol and wherein the first node is associated with the first autonomous system number; and/or
  - at least one entry associated with the first autonomous system number in at least one routing table kept by the second node for the implementation of the dynamic routing protocol in the network;
  - a first replacing module, enabled if at least one active session exists, and configured to replace the first autonomous system number associated with the first node in said at least one active session with said at least one second autonomous system number; and
  - a second replacing module, enabled if at least one entry exists in at least one routing table kept by the second node, and configured to replace in said at least one routing table the first autonomous system number associated with said at least one entry with said at least one second autonomous system number.

The invention offers a simple solution for managing the migration of AS numbers within a network using a dynamic routing protocol and which does not cause any interruption of service. This solution is based on the dynamic configuration of a new AS number at the level of a first network node using a first AS number, then the automatic propagation of this configuration to the other nodes of the network (second and third nodes within the meaning of the invention) thus allowing this new AS number to be taken into account, particularly in the active sessions in which the first node is involved and was using the first AS number, without interrupting these active sessions.

This automatic propagation is advantageously allowed by the introduction of a new command message addressed to the network nodes at the level of which the first node is associated with its first autonomous system number, i.e. nodes that have been informed of routes passing through the first node and which have stored these routes in routing tables used for the implementation of the dynamic routing protocol. The command message is propagated by nearest neighbor within the network, first between the first node and the neighbor nodes with which it is engaged in an active session, then between these neighbor nodes and their own neighbor nodes to which they have announced a route passing through the first node or which have announced to them a route passing through the first node. This ensures that the new configuration of the first node, and especially the migration of its autonomous system number, is signaled to each network node that is liable to make a reference at any time to the autonomous system number that is associated with the first node, whether for example for setting up a session according to the dynamic routing protocol with the first node, updating in one of its routing tables of a route passing through this first node or the announcement to a neighbor node of such a route.

Thus, the invention makes it possible to automate and simplify certain operations required for the enabling and proper operation of the dynamic routing protocol within the network. This has a particular advantage in the event of introduction of new autonomous system numbers, organization of the network into several autonomous systems, or migration of all or some of the AS numbers used in a network to a new format, the invention allowing the automatic renumbering of the AS numbers within the network without any interruption of service. This results in the consolidated stability of the network implementing the dynamic routing protocol. Furthermore, the invention advantageously makes it possible to limit the load and number of control messages exchanged between the network nodes to take into account the migration of the AS numbers: specifically, owing to the invention, no route needs to be deleted then reinstalled due to the change of AS number(s). The management of the networks enabling the dynamic routing protocol is therefore simplified.

Note that no limitation is attached to the dynamic routing protocol under consideration. The invention certainly has a preferred application when the routing protocol implemented in the network is the BGP protocol. However, it is equally applicable to other dynamic routing protocols, such as for example the BGPsec or TRIP protocols.

In accordance with the invention, the configuration message addressed to the first node may comprise one or more second AS numbers to be used by the first node as a replacement for its first AS number. Different ways of signaling the AS number or numbers to which the first node has to migrate may be envisioned.

Thus, in a particular embodiment of the configuration method according to the invention, said at least one item of information representing said at least one second autonomous system number may comprise:

said at least one second autonomous system number; or at least one difference between said at least one second autonomous system number and said first autonomous system number.

The second option makes it possible to minimize the software modifications needed and to thus simplify the implementation of the invention. By relying on the second option, it is possible to initialize a session according to the dynamic routing protocol between the first node and another network node by associating, in this session, an AS number and a "delta" variable with the first node. The "delta" variable is given a value of 0 during the initialization, and then a value of the difference indicated in the configuration message when a change of AS number of the first node is required. This makes it possible to modify the configuration of the active session in which the first node is participating without interrupting it.

Different methods of enabling the second AS number(s) may be envisioned: the change of AS number may have an immediate effect or on the contrary a deferred effect. The conditions of application of the change of AS number can be specified in the configuration message (for example in a field provided for this purpose).

Thus, in a particular embodiment of the configuring method according to the invention, during the configuring step, the first node is configured to immediately use on said network said at least one second autonomous system number.

Note that in this embodiment, although an immediate use of said at least one second system number by the first node is required, it is possible to envision keeping the first AS number in the local configuration of the first node, for at least a certain period. This embodiment may be advantageous for introducing real-time traffic engineering policies required, for example, for the mitigation of denial of service attacks or in the event of duplicate AS numbers being detected.

In another embodiment of the invention of the configuring method according to the invention, during the configuring step, the first node is configured to use on said network said at least one second autonomous system number in a deferred manner on detecting a predetermined event indicated in the configuration message.

Such an event may for example be the detection of a particular timestamp or the expiry of a timeout. This embodiment can advantageously be made use of to ensure that the other network nodes have had the time to be informed of the AS number associated with the first node. In doing so, the configuration of the dynamic routing protocol is coordinated within the network domain thus ensuring the global consistency of the network nodes.

In this particular embodiment, the command message may also comprise an indication of a timeout expiry to be observed by said at least one second node to replace the first autonomous system number associated with said first node with said at least one second autonomous system number.

Correspondingly, when the command message comprises such an indication, the steps for replacing the processing method according to the invention are scheduled to be executed at the indicated timeout expiry, in other words so that the change of AS number is enabled automatically or, in an equivalent manner, is effective upon this expiry.

As mentioned previously, in accordance with the invention, the second node is configured to replace, in its active sessions with the first node and in its routing tables, the first AS number initially assigned to the first node with said at least one second AS number which is sent to it in the command message.

In a particular embodiment according to the invention, the processing method further comprises, if there exists at least one entry associated with the first autonomous system number in a routing table containing at least one route announced by the second node to at least one third network node neighboring the second node, a step of sending the command message to said at least one third node.

This allows the propagation of the new configuration of the first node in the network, including to the nodes that do not have active sessions with the first node. The second node, by this intermediary, informs the nodes to which it has announced routes passing through the first node of the new configuration of the first node. Each of the third nodes thus informed can in turn implement the processing method according to the invention. In other words, in the processing method according to the invention, the second node is either a node having an active session with the first node, or a node to which a route passing through the first node has been announced by another node in the network.

Furthermore, in this embodiment, when the command message received by the second node comprises a timeout period to be observed before applying said at least one second autonomous system number, the processing method may comprise a decrementing step before sending the command message to said at least one third node, of the timeout by a time of processing of the command message by the second node and a time of directing of the command message between the second node and said at least one third node.

In this way, the timeout expiry for enabling the new configuration of the first node set by the configuration message is observed. This ensures that the migration of the AS number from the first node to the second AS node is done automatically at the required timeout expiry.

In a particular embodiment, the different steps of the configuration method and/or the processing method are determined by the instructions of computer programs.

Consequently, the invention also concerns a computer program on an information medium, this program being able to be implemented in a device or a network node or more generally in a computer, this program including instructions suitable for implementing the steps of a configuring method or a processing method as described above.

This program can use any programming language, and be in the form of source code, object code, or intermediate code between source code and object code, such as in a partially compiled form, or in any other desirable form.

The invention also concerns an information or computer-readable recording medium, and including computer program instructions as mentioned above.

The information or recording medium can be any entity or device capable of storing the program. For example, the medium may include a storage means, such as a ROM, for example a CD-ROM or a microelectronic circuit ROM, or else a magnetic recording means, for example a diskette (floppy disk) or a hard disk.

In addition, the information or recording medium may be a transmissible medium such as an electrical or optical signal, which can be conveyed via an electrical or optical cable, by radio or by other means. The program according to the invention may in particular be downloaded over a network of Internet type.

Alternatively, the information or recording medium can be an integrated circuit into which the program is incorporated, the circuit being suitable for executing or for being used in the execution of the method in question.

The invention also concerns a communication system in a network implementing a dynamic routing protocol, said system comprising:
at least one device, the so-called first node, in accordance with the invention, configured with a first autonomous system number and able to receive a configuration message comprising at least one second autonomous system number intended to be used by the first node on the network; and
at least one device, the so-called second node in accordance with the invention, able to implement a processing method according to the invention.

The communication system according to the invention benefit from the same advantages set out previously as the first and the second node according to the invention.

In a particular embodiment, the communication system comprises a controller and a plurality of first nodes in accordance with the invention configured with said first autonomous system numbers, said controller being configured, when said separate first autonomous system numbers are to be replaced by second autonomous system numbers, to successively send to said first nodes configured with these separate first autonomous system numbers the configuration messages comprising said second autonomous system numbers, said controller being configured to await after sending a so-called configuration message intended to replace a said first autonomous system number to at least one first node configured with this first autonomous system number, the effective replacement of said first autonomous system number in the communication system before sending a configuration message intended to replace another said first autonomous system number to at least one other so-called first node configured with this other first autonomous system number.

This embodiment consists in managing the migration of a single AS number at once within the network infrastructure. In other words, the controller schedules the different migration operations of the AS numbers to ensure the proper conducting of the migration procedure, a new migration of an AS number only being undertaken when the migration of the previous AS has been executed and taken into account by the network. This ensures the stability of the network that has implemented the dynamic routing protocol following the migration of an AS number before undertaking a new migration.

In another embodiment, the communication system comprises a controller and a plurality of first nodes in accordance with the invention configured with said first autonomous system numbers, said controller being configured, when said separate first autonomous system numbers associated with said first nodes are to be replaced by second autonomous system numbers, to include in said configuration messages sent to said first nodes an indication of one and the same timeout expiry to be observed for each of said first nodes to use within the network said second autonomous system numbers as a replacement for said first autonomous system numbers.

In other words, all the AS number migrations envisioned at a given instant are triggered simultaneously in the network by the controller.

It is also possible to envision, in other embodiments, that the configuring method, the processing method, the so-called first node device, the so-called second node device, and the communication system according to the invention have in combination all or part of the aforementioned features.

BRIEF DESCRIPTION OF THE DRAWINGS

Other features and advantages of the present invention will become apparent from the description given below, with reference to the appended drawings which illustrate an exemplary embodiment thereof devoid of any limitation. In the figures:

FIG. 1 schematically represents a communication system in accordance with the invention, in a particular embodiment;

FIG. 2 illustrates a device of the communication system of [FIG. 1], in accordance with the invention;

FIG. 3 schematically represents the hardware architecture of the device of FIG. 2, in a particular embodiment;

FIG. 4 represents, in the form of a flow chart, the main steps of a configuring method according to the invention as implemented by a device of the communication system of [FIG. 1] in a particular embodiment;

FIG. 5A represents a format of the command messages used by the invention;

FIG. 5B represents another format of the command messages used by the invention;

FIG. 5C represents another format of the command messages used by the invention;

FIG. 6 represents, in the form of a flow chart, the main steps of a processing method according to the invention as implemented by a device of the communication system of [FIG. 1] in a particular embodiment;

FIG. 7A illustrates the updating of the local configuration of the device during the processing method represented in FIG. 6;

FIG. 7B also illustrates the updating of the local configuration of the device during the processing method represented in FIG. 6;

FIG. 7C also illustrates the updating of the local configuration of the device during the processing method represented in FIG. 6;

FIG. 8A illustrates the migration in several steps of several AS numbers implemented within the communication system of FIG. 1 in a particular embodiment;

FIG. 8B also illustrates the migration in several steps of several AS numbers implemented within the communication system of FIG. 1 in a particular embodiment;

FIG. 8C illustrates the migration in several steps of several AS numbers implemented within the communication system of FIG. 1 in a particular embodiment; and FIG. 9 illustrates the migration in a single step of several AS numbers implemented within the communication system of FIG. 1 in a particular embodiment.

DETAILED DESCRIPTION OF THE INVENTION

FIG. 1 represents, in its environment, a communication system 1 in accordance with the invention, in a particular embodiment.

In the example envisioned in FIG. 1, the communication system 1 comprises a plurality of network devices (4 in number in FIG. 1, globally referred to as T), here all in accordance with the invention, and belonging to the network infrastructure of a data center (DC). The network devices T are interconnected via one or more links connecting communication interfaces of said devices (illustrated in FIG. 1 in broken lines) and form a communication network R. More specifically, in the example shown by way of illustration in 1, the network devices T21 and T22 are each connected to the network devices T31 and T32.

No limitation is attached to the nature of the network devices T (also known as nodes of the network R): these are any kind of network element, such as for example routers, switches etc. Nor is any limitation attached to the nature of the communication interfaces used by the devices T to communicate with one another within the network R. These communication interfaces can be wired or wireless, mobile or fixed, physical or virtual etc.

The communication network R formed by the devices T implements a dynamic routing protocol. In the embodiment described here, the dynamic routing protocol under consideration is the BGP protocol, particularly described in the document RFC 4271 published by IETF (Internet Engineering Task Force). The invention can however be applied to other dynamic routing protocols using AS numbers, such as for example the secure version BGPsec of the protocol BGP described in document RFC 8205 edited by the IETF, the TRIP routing protocol, or the Link-State Vector Routing (LSVR) protocol pending specification at the IETF.

In the example illustrated in FIG. 1, the communication system 1 is organized into a plurality of hierarchical levels (two in FIG. 1 referenced as NIV1 and NIV2), each hierarchical level being itself organized into one or more clusters (i.e. groups) of devices: a cluster for the hierarchical level NIV1 comprising two devices T21 and T22, and two clusters for the hierarchical level NIV2 each respectively comprising a device T31 and a device T32. The network devices of the last hierarchical level NIV2 are here connected to the different virtual or hardware machines 3 (e.g. servers) of the data center.

Of course, this network infrastructure architecture and its organization into hierarchical levels and into clusters (comprising one or more devices) is given solely by way of illustration, and the invention is applicable to other types of architecture (whether or not it has a central unit such as the controller 2). The choice of the architecture of the network R is to do with the engineering of the network, its topology, the size of the data center, etc.

In a manner known per se, the devices or nodes T of the network R must, to set up BGP sessions within the network R with their neighbors (i.e. with the devices of the network R with which they have a set-up physical connection), know the autonomous system number or numbers which are associated with them (i.e. to which they are attached), as well as the autonomous system numbers with which their neighbors are associated. In the example of network infrastructure architecture envisioned in FIG. 1, the following choices are made by the operator of the data center for this allocation:

use of private AS numbers; and
use of one and the same AS number for the devices of the network located at one and the same hierarchical level and belonging to one and the same cluster.

Thus, by way of illustration in FIG. 1, the nodes T21 and T22 are associated with the AS number 65001, the node T31 with the AS number 65002 and the T32 with the AS number 65003. The nodes T21, T22, T31 and T32 are configured with these AS numbers, i.e. these AS numbers are stored in the local configuration of the nodes (itself stored in a non-volatile memory of the nodes), for example in a variable "cur-asn". It is these numbers that the nodes use when setting up BGP sessions with their neighbors.

This policy of allocation of AS numbers is of course given solely by way of illustration. Other policies may be implemented by the operator of the data center (for example, allocation of one and the same AS number for all the devices belonging to one and the same hierarchical level, or of one and the same AS number for all the devices of the network, separate AS numbers by address family etc.).

As mentioned previously, when a migration of one or more AS numbers associated with one or more nodes of the communication system 1 is envisioned, the invention makes it possible to dynamically and automatically configure the nodes of the communication system 1 without causing any interruption of service (and particularly without interrupting the active BGP sessions in the network R). The term "migration" is here understood to mean a change of the AS number that is associated with a node of the communication system 1 and with which it has been configured to set up and maintain BGP sessions, regardless of whether this migration follows on from an initial configuration of the node in question or from a dynamic configuration as proposed by the invention. Nor is any limitation attached to the reason for this migration (change of format of AS numbers, organization of the network into several autonomous systems, grouping of nodes within one and the same autonomous system etc.).

Thus, it is here supposed by way of illustration that the migration results from a desire of the operator of the data center to change the format of the AS numbers used in its network infrastructure, by migrating from a format encoded on 2 octets to a format encoded on 4 octets. More specifically, the operator wishes to migrate the AS numbers 65001, 65002 and 65003 (first AS numbers within the meaning of the invention) which have been initially associated with the devices T21, T22, T31 and T32, to the AS numbers 4200000001, 4200000002 and 4200000003 (second AS numbers within the meaning of the invention) respectively.

Note that, for simplicity's sake, it is the migration of an AS number to a single AS number (for example 65001 to 4200000001) that is being considered. However, the invention is also applicable when envisioning the migration of an AS number to a plurality of separate AS numbers, the associated node then having the possibility after migration to use any one of these AS numbers to set up and maintain BGP sessions within the network R.

In the example envisioned here, the network infrastructure on which the data center is supported implements a SDN (Software Defined Network) architecture. This assumption is however not a pre-requisite for implementing the invention.

This infrastructure comprises, besides the network devices T, a controller 2 allowing a consistent and deterministic exploitation of the network R of the data center. The controller 2 has, in a known manner, a global and system-wide view of the network R, its topology, its components, available network functions (virtual or otherwise), their states, etc. This controller 2 is capable of defining a routing policy within the network R, relying on the BGP protocol, and making it possible to direct the traffic of the data center in a manner compliant with the objectives set by the operator of the data center. It is, in the example illustrated by FIG. 1, for the requirements of the envisioned migration, linked to each of the devices of the network T, namely the devices T21, T22, T31 and T32. In the example of architecture envisioned here, it is the controller 2 which communicates to each of the devices T21, T22, T31 and T32 the AS number that they must take into account.

In the embodiment described here, the devices T of the network R are all in accordance with the invention. For this purpose, as illustrated by FIG. 2, each device T of the network is equipped at once with means 4 allowing it to configure itself with one or more AS numbers on the basis of a configuration message that the controller 2 has sent to it in accordance with the invention, and thus to act as a first node within the meaning of the invention, and means 5 allowing it to process in accordance with the invention a command message originating from one of its neighbor nodes in the network R and signaling to it a change of an AS number of one of the nodes of the network R, and thus to act as a second node within the meaning of the invention. It should however be noted that the means 4 and 5 are not necessarily enabled simultaneously at the level of the device T. Thus for example, if the device T is not the subject of a migration of the AS number with which it was previously configured, the means 4 may be disabled, whereas its means 5 are enabled to take into account any migrations of AS numbers associated with other nodes of the network R. Conversely, as soon as a device T is concerned by a migration of the AS number that is associated with it, its means 4 are enabled.

In the embodiment described here, the devices T of the network R have the hardware architecture of a computer 6 as illustrated by FIG. 3. They notably comprise a processor 7, a random-access memory 8, a read-only memory 9, a non-volatile flash memory 10, as well as communicating means 11 comprising one or more communication interfaces.

The communicating means 11 notably allow each device T to be linked to the controller 2 as well as to one or more other devices T of the network R, and to communicate with these other devices particularly for the routing and directing of the traffic within the network using the BGP protocol. For this purpose, the devices T are configured to listen by default on the TCP port 179 for the purpose of receiving BGP messages. Other port numbers may be used to receive the configuration and command messages needed to implement the invention as soon as the devices T have been instructed to do this beforehand.

The read-only memory 9 of each network device T constitutes a recording medium in accordance with the invention, readable by the processor 7 and on which are recorded computer programs PROG4 and PROG5 in accordance with the invention: the program PROG4 includes instructions for executing the steps of the configuration method according to the invention, whereas the program PROG5 includes instructions for executing the steps of the processing method according to the invention.

More specifically, the computer program PROG4 defines functional (and here, software) modules of the means 4 of the device T, which are configured to implement the steps of the configuration method according to the invention when the means 4 of the device T are enabled. The functional modules defined by the program PROG4 rely on and/or control the hardware elements 7-11 of the computer 6 mentioned previously, and notably comprise here, as illustrated in FIG. 2:

- a receiving module 4A, able to receive a configuration message comprising at least one item of information representing at least one autonomous system number denoted new-asn intended to be used by the device T as a replacement for the current autonomous system number (i.e. that contained in the variable cur-asn, subsequently denoted v-asn) with which it is configured when it receives the configuration message. The receiving module 4A in particular exploits the communicating module 11 of the device T;
- a configuring module 4B parameterized (or scheduled) to configure the device T with said at least one autonomous system number new-asn received in the configuration message, in other words to replace in its local configuration, in the variable cur-asn, the AS number v-asn by the new AS number new-asn;
- an identifying module 4C configured to identify at least one other device or network node having at least one active BGP session with the device T, and for which the device T is associated with the autonomous system number v-asn; and a sending module 4D, configured to send to this other device a command message requesting the replacement thereby of the autonomous system number v-asn associated with the device T with by said at least one autonomous system number new-asn communicated in the configuration message. The sending module 4D also makes use of the communicating module 11 of the device T.

The computer program PROG5 defines functional (and here, software) modules of the means 5 of the network device T, defined to implement the steps of the processing method according to the invention when the means 5 of the device T are enabled. The functional modules defined by the program PROG5 rely on and/or control the hardware elements 6-10 of the computer 6 mentioned previously, and notably comprise here, as illustrated in FIG. 2:

a receiving module 5A, able to receive a command message requesting a replacement of an autonomous system number denoted v-asn1 associated with another network node, with at least one other autonomous system number denoted new-asn1;

a verifying module 5B, configured to verify if there exists: at least one active BGP session between this other network node and the device T, and wherein the other node is associated with the autonomous system number v-asn1; and/or at least one entry associated with the autonomous system number v-asn1 in at least one routing table kept by the device T for implementing the BGP protocol in the network;

a first replacing module 5C enabled if there exists at least one active session, and configured to replace the autonomous system number v-asn1 in said at least one active session with said at least one autonomous system number new-asn1; and a second replacing module 5D, enabled if there exists at least one entry in at least one routing table kept by the device T, and configured to replace in said at least one routing table the autonomous system number v-asn1 associated with said at least one entry with said at least one autonomous system number new-asn1.

In the embodiment described here, the program PROG5 further defines a sending module 5E, enabled if there exists at least one entry associated with the autonomous system number v-asn1 in a routing table containing at least one route announced by the device T to at least one of its neighbor nodes in the network R, this sending module 5E being configured to send the command message to said one of said neighbor nodes of the device T.

We are now going to describe in more detail the functions of the different modules 4A-4D and 5A-5E of the devices T of the network.

FIG. 4 represents the main steps of a configuring method according to the invention, as implemented by the modules 4A-4D of a device T of the network R, in a particular embodiment. The device T is for example here, by way of illustration, the device T21.

It is supposed that the device T21 was previously configured during a step of initial configuration (step E00) with the AS number 65001, in a manner known per se. It is assumed for illustration purposes that the configuration has been carried out by the controller 2; this assumption is however neither required nor necessary for the implementation of the invention. Such a configuration may thus be carried out by means of instructions sent by the controller 2 to the device T21 via an interface INTERF using, for example, a Telnet or SSH (Secure Shell) connection combined with a syntax CLI (for Command Line Interface), or by using the NETCONF protocol and the YANG (for Yet Another Next Generation) language, etc. The AS number 65001 is stored in the variable cur-asn of the local configuration of the device T21, in its non-volatile memory 10. This is the current AS number used by the device T21 to maintain BGP sessions within the network R.

Further to this configuration, the device T21 uses the current AS number 65001 contained in the variable cur-asn on the network R to set up BGP sessions with its neighbors. The current AS number 65001 is a first AS number within the meaning of the invention. In the example envisioned in FIG. 1, the device T21 sets up a BGP session with the device T31 and a BGP session with the device T32 by presenting the AS number that has been associated with it, namely 65001.

The device T21 also uses this AS number to announce to its neighbor routes or prefixes that can be reached by the announced routes.

By way of illustration, these different operations conducted by the device T21 may result from instructions sent by the controller 2 via the aforementioned interface in a configuration message in accordance for example with the following format:

Router bgp 65001
Network 1.0.0.0/8
Network 2.0.0.0/8
Neighbor @IP(T31) remote-as In this example, the controller 2 asks the device T21 which is acting as a router BGP and has the current AS number 65001 to set up a BGP session with its neighbor the device T31, which has the IP (Internet Protocol) address @IP(T31) and which is associated with the AS number 65002. It also asks the device T21 to announce to its neighbor T31 the prefixes 1.0.0.0/8 and 2.0.0.0/8 indicating its AS number 65001.

It is now assumed, as explained previously, that a migration of the AS number 65001, encoded on two octets, is envisioned by the operator of the data center relying on the network R, to an AS number encoded on four octets, and more specifically to the AS number 4200000001 (second AS number within the meaning of the invention).

For this purpose, the controller 2 sends a configuration message to the device T21 via the interface INTERF to notify it of the new AS number denoted new-asn that it wishes to associate with it, i.e. the target AS number to which the operator has decided to migrate the device T21 (i.e. 4200000001).

This configuration message comprises a command CMD containing an item of information representing the new autonomous system number new-asn=4200000001 intended to be used by the device T21 as a replacement for the current autonomous system number 65001 which is associated with it. This command CMD is for example a command "set new-asn" completed by an item of information info-new-asn representing the new AS number new-asn that the operator wishes to associate with the device T21 (i.e. "set new-asn info-new-asn").

Note that if the device T21 has been configured during the step E00 with several separate AS numbers (in other words, several current AS numbers v-asn1, v-asn2, . . . , given as values of the variables cur-asn1, cur-asn2, . . . of the local configuration of the device T21, are associated with it), the command CMD can further designate which of these current AS numbers is or are intended to be replaced by the new AS number new-asn. For this purpose, the command CMD can for example take the form "set v-asn1 new-asn info-new-asn" to indicate that it is the current AS number, the value of which is v-asn1 that must be replaced by the AS number info-new-asn.

Moreover, in the example envisioned here, for the sake of simplicity, it is assumed that the envisioned migration is done to a single AS number. However, this assumption is not limiting and the invention may also apply when one wishes to migrate the current AS number of a device to several AS numbers, in which case the command CMD specifies the different items of information representing each of these different AS numbers.

The item of information info-new-asn representing the new AS number may be of different natures. It may for example be the new AS number new-asn strictly speaking (i.e., 4200000001 in the example envisioned here), or, in a variant, the difference Δ-asn (positive or negative) between the new AS number new-asn and the current AS number v-asn used by the device T21 (i.e. (Δ-asn)=(new-asn)−(v-asn)).

The device T21 receives via its receiving module 4A the configuration message sent by the controller 2 and containing the command CMD (step E10), and validates the configuration message. In particular, the validation consists in verifying that the controller is authorized to issue AS number migration instructions, that the format of the configuration message is compliant with the format previously described ("set . . . " command), and that the new AS number is a valid AS number.

Then it obtains from the configuration message the new AS number new-asn that is assigned to it (either directly from the item of information info-new-asn included in the configuration message, or if this item of information is a difference Δ-asn, by adding this difference to its current AS number v-asn specified in the variable cur-asn) (step E20).

In the embodiment described here, the command CMD sent in the configuration message by the controller 2 to the device T21 further contains an indication of a mode of application, or in other words of use, by the device T21 of the new AS number new-asn that is associated with it (step E30). This mode of application specifies whether the use of the new AS number new-asn by the device T21 is to be immediate or deferred. Thus, for example, the command CMD may specify:

a mode of immediate use, consisting in applying the change of AS number of the device T21 immediately, in other words, for the device T21 to immediately replace in its local configuration in the variable cur-asn the AS number v-asn=65001 with the new AS number new-asn=4200000001, and immediately use this new AS number new-asn which is associated with it in BGP procedures. This mode can be enabled, for example, via a command of "set new-asn info-new-asn immediate" type, in which the "immediate" sequence reflects the immediate application of the command to use the AS number new-asn;

a mode of immediate use with preservation of the old AS number for a certain time period. In other words, the device T21 immediately stores in its local configuration (in the variable cur-asn), the new AS number new-asn=4200000001 as a replacement for the AS number 65001, while preserving its old AS number 65001 in another variable denoted old-asn provided for this purpose, during a predetermined period. The device T21 is moreover configured to immediately use the new AS number new-asn that is now associated with it. This mode of use can be enabled for example via a command taking the form "set new-asn info-new-asn immediate pre-serve-old timer" in which the sequence "immediate preserve-old timer" reflects the immediate application of the command to use the AS number new-asn with preservation of the old AS number, the value "timer" defining the time during which the old AS number (i.e. the AS number 65001 in the envisioned example) must be preserved in the variable old-asn in the local configuration of the device T21;

a mode of deferred use with indication of a timeout expiry at which to apply/use the new AS number. This timeout expiry consists in the detection of a particular event indicated in the configuration message. Such an event may for example be a particular timestamp (for example, the 31 Oct. 2019 at 10h00), or a timeout period to be observed (for example, 10800 seconds), etc. This mode of use may be enabled for example via a command taking the form "set new-asn info-new-asn event-type event event-value" in which the sequence "event-type event event-value" reflects the application of the command of deferred use with indication of a timeout expiry, "event" defining the type of event to be detected and "event-value" the value of this event. For example if the event is the expiry of a timeout period, the event "event" may give the value "timer" (to indicate that a timeout period must be observed) and the value "event-value" to the duration of this timeout period (for example, 3600 for 3600 s). Note that a zero timeout period is equivalent to a mode of immediate use of the new AS number. If the event is the detection of a particular timestamp, the event "event" may be set to the value "date" and the value "event-value" to the effective date and time of application (i.e. use) of the new AS number (for example, 2019-10-31T10:00Z).

These exemplary embodiments are given solely by way of illustration and other modes and also other formats for signaling these modes may be considered.

It is here assumed, by way of illustration, that the command CMD specifies a mode of deferred use with indication of an event of timestamp type.

After obtaining the new AS number new-asn and the mode of use to be applied, the device T21 via its configuring module 4B schedules the updating of its local configuration to take into account the new AS number new-asn (step E40). This scheduling depends, in the embodiment described here, on the mode of use specified in the command CMD.

More specifically, when the use mode indicated in the command CMD specifies an immediate use (or by default if no use mode is specified in the command), this update is done immediately by the configuring module 4B: the configuring module 4B replaces in the variable cur-asn of the local configuration of the device T21 the value v-asn=65001 with the value new-asn=4200000001.

When the use mode indicated in the command CMD specifies an immediate use with preservation of the old AS number, as mentioned previously, the configuring module 4B copies the value v-asn=65001 contained in the variable cur-asn into a variable old-asn kept in the local configuration, then replaces in the variable cur-asn the value v-asn=65001 with the value new-asn=4200000001. The variable old-asn is kept equal to the value 65001 for the period specified in the command CMD. Beyond this period, the value 65001 is deleted or erased.

When the use mode indicated in the command CMD specifies a deferred use with indication of a timeout expiry consisting in the detection of a particular event, the configuring module 4B schedules the updating of the local configuration of the device T21, and particularly the replacement in this local configuration of the value v-asn stored in the variable cur-asn with the value new-asn, so that the latter is automatically implemented on detection of the particular event specified in the command CMD. For example if this event is a timestamp, the updating of the local configuration is scheduled to be executed on detection of this timestamp by the device T21.

In a variant, the updating of the local configuration may be done ahead of the detection of the event but only be enabled starting from this detection.

Note that once its local configuration has been updated, the device T21 is scheduled to use in its BGP sessions (future and in progress) and to announce via the BGP protocol of the routes and/or prefixes on the network R (i.e. in the attribute AS_PATH of the BGP messages it exchanges with its neighbors), the AS number contained in the updated variable cur-asn, or in other words, the AS number new-asn. Starting from this update (or its enabling) it no longer uses its old AS number v-asn.

Then the device T21 identifies, by way of its identification module 4C, the nodes of the network R with which it is maintaining an active BGP session associated with its AS number v-asn (in other words the AS number with which it was configured before the updating of its configuration) (step E50). In the example envisioned here, the device T21 is maintaining active BGP sessions associated with its AS number v-asn with the nodes T31 and T32. It therefore identifies, in the step E50, the devices T31 and T32 (second nodes within the meaning of the invention).

The device T21 then sends, via its sending module 4D, to each of the identified devices, a command message informing them of the migration of its AS number (step E60): this command message requires the replacement by these devices of the AS number v-asn associated with the node T21 with its new AS number new-asn, particularly in the active BGP sessions it is maintaining with them.

In the embodiment described here, the command message sent by the device T21 is an message ACTION, preceded by a generic BGP header as illustrated by FIG. 5A and described in detail in the document RFC 4271 published by the IETF. The field Type that indicates the BGP message under consideration is for example set to a value of 5, a value newly defined with respect to the values 1 to 4 described in the document RFC 4271 to specify that it is a message of ACTION type.

The command message ACTION moreover comprises a plurality of fields or parameters as illustrated by FIG. 5B and more particularly:

a parameter "Current ASN" giving the AS number to be replaced, namely, in the example envisioned here, v-asn=65001;

a parameter "New ASN" giving the new AS number to be taken into account, namely, in the example envisioned here, new-asn=4200000001. Note that, if a plurality of new AS numbers is envisioned, this parameter may comprise said plurality of new AS numbers. In a variant, a separate ACTION message, for each new AS number may be used; and a parameter "Event" or "Timer" indicating the timeout expiry to be observed before proceeding with the effective replacement of the AS number given in the parameter "Current ASN". A value of the parameter "Event" or "Timer" set to 0 means an immediate enabling or taking into account of the new AS number.

Note that the ACTION message is a new message that does not exist in the current version of the BGP protocol.

In the example in FIG. 5B, the ACTION message further comprises a field "Action Code" defining the nature of the action to be undertaken by the device receiving the ACTION message. This field is for example set to a value of 0 to indicate an action of migration of AS numbers, in other words, the ACTION message requires the replacement by the device that receives it of an AS number as specified in the message parameters.

Note that the presence of this field is optional and makes it possible to use the ACTION message to order other actions at the nodes of the network R. In a variant, it is possible to envision that the very type of the message (ACTION message) indicates to the device that receives it that it must replace the AS number specified in the "Current ASN" field with the AS number specified in the field "New ASN".

The ACTION message represented in FIG. 5B also comprises a field "Optional Data" for entering other data such as a list of neighbors with which the procedure is to be implemented. Other items of information can be envisioned.

A second, more general example of the ACTION message format is illustrated by FIG. 5C. The fields bearing the same name as those defined in FIG. 5B have the same meaning as in FIG. 5B.

Unlike the format illustrated by FIG. 5B, the ACTION message of FIG. 5C does not directly comprise the new AS number to be used but items of information making it possible to determine this new AS number.

More specifically, the ACTION message illustrated by the FIG. 5C comprises a field "Operation Code" filled with the code of an operation to be applied to obtain the new AS number using as input variables the parameters filling the fields "Current ASN" and "ASN Value". The following operation codes may for example be defined:

"0": no operation to be carried out, i.e. the value contained in the field "ASN Value" corresponds to the new AS number to be used;

"1": an addition must be carried out, i.e. the new AS number is obtained by adding the value contained in the "Current ASN" field to the value contained in the field "ASN Value";

"2": a subtraction must be carried out, i.e. the new AS number is obtained by subtracting from the value contained in the "Current ASN" field the value contained in the field "ASN Value";

"3": a multiplication must be carried out, i.e. the new AS number is obtained by multiplying the value contained in the "Current ASN" field by the value contained in the field "ASN Value";

etc.

A description will now follow, with reference to FIG. 6, of the different steps of the processing method according to the invention, as implemented by each of the devices T31 and T32 on receiving the ACTION message sent by the device T21, in a particular embodiment. In the remainder of the description, only the device T31 will be of interest, the device T32 implementing the same steps as the device T31.

On receiving the ACTION message by way of its module 5A (step F10), the device T31 proceeds, in the embodiment described here, to the validation of this message (test step F20). This validation consists in one or more safety checks particularly making it possible to check the integrity and authenticity of the ACTION message (as per the use conditions described in RFC4271), but also whether or not the neighbor is authorized to issue the ACTION message. In a variant, other checks may be envisioned, for example pertaining to the observing of a frequency of sending of the ACTION messages reaching the device T31 (to avoid instability of the BGP protocol), etc.

If the message is not validated ("no" answer to the test step F20), it is rejected and no action is taken by the device T31 (step F30).

If the message is validated ("yes" answer to the test step F20), the device T31 verifies, by way of its verifying module 5B, if it maintains states associated with the old AS number of the device T21, in other words the AS number specified in the "Current ASN" field of the ACTION message received from the device T21 (test step F40). The term "maintaining states associated with the old AS number" is understood to mean states reflecting one or more active BGP sessions associated with this AS number or entries of tables, and in particular routing tables or RIB (pour Routing Information Base) tables used by the BGP protocol and associated with this AS number.

More specifically, the verifying module 5B of the device T31 verifies in step F40 if there exists:

at least one active BGP session between the device T21 and the device T31 wherein the device T21 is associated with the AS number identified in the "Current ASN" field of the ACTION message (in other words, in the example envisioned here, the AS number 65001); and/or at least one entry associated with the AS number identified in the "Current ASN" field of the ACTION message, i.e. with the AS number 65001, in at least one routing table kept by the device T31, for example in its non-volatile memory 10, for the implementation of the BGP protocol in the network R. Such a routing table may for example be a local routing table of Loc-RIB type, kept by the device T31 in its non-volatile memory 10, a routing table of Adj-RIB-In type logging the routes received from its neighbors (in the BGP UPDATE messages transiting over the network R), or else a routing table of Adj-RIB-Out type containing the routes that the device T31 announces to its neighbors.

If the device T31 does not identify any active session associated with the AS number 65001 nor any entry in one of its routing tables associated with this AS number ("no" answer in the test step F40), then the ACTION message is ignored and no action is taken by the device T31 (step F30).

If an active BGP session between the device T21 and the device T31 is detected by the verifying module 5B ("yes" answer in the test step F40), then the device T31, via its first replacing module 5C, updates its local configuration by replacing in the state corresponding to this active session, the AS number 65001 with the new AS number new-asn=4200000001 associated with the device T21 and obtained from the ACTION message (step F50).

If an entry associated with the AS number 65001 is detected by the verifying module 5B in one of the routing tables kept by the device T31 ("yes" answer to the test step F40), then the device T31, via its second replacing module 5D, updates its local configuration by replacing in the routing table the AS number 65001 associated with this entry by the new AS number new-asn=4200000001 (step F50).

Note that if the ACTION message comprises an indication of a timeout to be observed to carry out the replacement of the AS number 65001 by the new AS number 4200000001, the updating of the local configuration of the device T31, or at least the enabling of the configuration updated with the new AS number is scheduled to be automatically executed at this timeout. Before said timeout, the device T21 remains associated in the active session and/or for the entry in question with the AS number 65001.

FIG. 7A illustrates the step of replacing implemented by the first replacing module 5C and updating, in the local configuration of the device T31, of the state corresponding to an active session between the device T21 and the device T31. This active session was set up while the device T21 was associated with the AS number 65001 and the device T31 with the AS number 65002. The state corresponding to this active session maintained by the device T21 therefore reflects as the local AS number (referred to as loc-asn) the AS number 65001 and as the remote AS number (referred to as rem-asn) the AS number 65002. For this same active session, the corresponding state maintained by the device T31 reflects as the local AS number the AS number 65002 and as the remote AS number the AS number 65001.

After receiving an ACTION message sent by the device T21 to the device T31 containing the old AS number 65001, the new AS number 4200000001 associated with the device T21 and the timeout expiry Tupd upon which the migration of the AS number associated with the device T21 from the old number 65001 to the new number 4200000001 must be executed, the state corresponding to the active BGP session is updated by the device T31 when the timeout expiry is detected (i.e. at t=Tupd): the updated state then reflects as the local AS number the AS number 65002 and as the remote AS number the AS number 4200000001. Note that upon this same timeout expiry, the state corresponding to the active BGP session is also updated by the device T21 and then reflects as the local AS number the AS number 4200000001 and as the remote AS number the AS number 65002.

FIGS. 7B and 7C illustrate the replacing step, as implemented by the second replacing module 5D, and updating, in the local configuration of the device T31, of a routing table comprising an entry associated with the AS number 65001.

FIG. 7B represents an extract of the routing table before migration of the AS number associated with the device T21. The three first columns of the table respectively reflect the network prefix, the IP address of the neighbor to reach said network prefix, and the list of as-to be traversed to reach said prefix (reflecting the contents of the attribute AS_PATH).

FIG. 7C represents the same extract of the routing table after migrating the AS number associated with the device T21 to the AS number 4200000001.

In the embodiment described here, if the verifying module 5B has found the existence during the step F40 of an entry in a routing table (Adj-RIB-Out) containing a route announced by the device T31 to at least one of its neighbor devices ("yes" answer in the test step F60), the sending module 5E of the device T31 sends the ACTION command message to this or these neighbor devices to inform them of the migration of the AS number of the device T21 and allow them to update their routing table(s) in turn (step F70).

Otherwise ("yes" answer in the test step F60), the processing method implemented by the device T31 terminates (step F80).

Note that when the ACTION message is relayed by the device T31 to neighbors in the step F70, if this ACTION message contains a timestamp value as the expiry of the migration, the same timestamp is kept in the ACTION message relayed to the neighbors of the device T31.

If a timeout period is contained in the ACTION message to indicate the timeout expiry to be observed for the migration of the AS number (in other words before applying the new AS number associated with the device T21), the sending module 5E of the device T31 then modifies this timeout period before sending the ACTION message to ensure synchronization between the nodes of the network R concerned by the migration of the AS number. More particularly, the sending module 5E decrements the value of the timeout period by the time of processing of the ACTION message by the device T31 and the time of directing of the ACTION message between the device T31 and its neighbor devices. The time of directing between the device T31 and its neighbor devices may be configured on each of the devices by a controller beforehand, or be obtained using a method such as the sending of ICMP Echo Request (RFC792) addressed to the neighbor devices.

On receiving the ACTION message, the neighbors of the device T31 in turn implement the different steps of the processing method according to the invention. This ensures that the migration of the AS number associated with the device T21 is done automatically by all the nodes of the network R notified upon the timeout expiry indicated in the ACTION messages, and without affecting the BGP session in progress. Thus, owing to the invention, no unavailability of service is to be feared.

In the illustrative example envisioned here, as mentioned previously, it is assumed that the operator of the data center relying on the network R has decided to migrate the AS numbers associated with the devices of the network devices from a format encoded on 2 octets to a format encoded on 4 octets. We have just described with reference to FIGS. 4 to 7 the steps implemented by the devices of the network R to effect the migration of an AS number associated with a single device of the network, namely of the AS number 65001 encoded on two octets associated with the device T21, to the AS number 4200000001 encoded on four octets. Several strategies may be chosen by the operator of the data center to effect the migration of several AS numbers within the network R. These different strategies are controlled for example by the controller 2 which communicates to each of the concerned devices the configuration instructions required for the migration.

A first strategy consists in proceeding successively for each AS number concerned by the migration: in other words, the migration of a single AS number at a time is executed in the network R. According to this first strategy, when migrations of several separate AS numbers are envisioned, the controller 2 is configured to successively send to the devices of the network R configured with these separate AS numbers, configuration messages CMD comprising the AS numbers to which they are to migrate, the controller 2 being configured to await, after having sent a configuration message intended to replace an AS number designated, for example, by v-asn1 to one or more devices of the network R associated with this AS number v-asn1, the effective replacement of this AS number v-asn1 in the network R (in other words in the communication system 1) before sending a configuration message intended to replace an AS number designated, for example, by v-asn2.

FIGS. 8A to 8C illustrate this first strategy of migration of the AS numbers one after another.

More accurately, the FIG. 8A represents a first step of migration consisting in the migration of the AS number 65001 associated with the devices T21 and T22 to the AS number 420000001. The controller 2 sends to the devices T21 and T22 a configuration message CMD containing the AS number 4200000001 to which must be migrated the AS number 65001 with which they are both associated and an indication of the timeout expiry upon which this migration is to be performed. In the illustrated example this indication is a timestamp DD:HH:MM.

On receiving the configuration message CMD, the devices T21 and T22 send an ACTION command message to the devices T31 and T32 with which they have active BGP sessions. This command message comprises their new AS number as well as the timestamp DD1:HH1:MM1.

Starting from the timestamp DD1:HH1:MM1, the new AS number 4200000001 is effective in the local configurations of the different devices T21, T22, T31 and T32 of the communication system 1. Once the communication system 1 has stabilized following the execution of the migration of 65001 to 4200000001, the controller 2 may trigger a new migration consisting in replacing the AS number 65002 associated with the device T31 with the AS number 4200000002.

The successful execution of the migration may be determined according to several methods. By way of example, the controller can retrieve the BGP configuration of the devices T21 and T22 and of their neighbors to verify that the new AS number has been correctly taken into account. Thus, the controller can retrieve the routing tables of the devices of the network R and check that the new AS number is henceforth used to characterize routes ('Path' column in the FIG. 7). Alternatively, the controller can receive notifications of the device concerned by the migration to provide an account of the results of the migration operation.

FIG. 8B represents the second step of migration implemented by the controller 2. This step consists in the migration of the AS number 65002 to the AS number 420000002. The controller 2 sends to the device T31 a configuration message CMD containing the AS number 4200000002 to which must be migrated the AS number 65002 with which it is associated and an indication of the timeout expiry DD2:HH2:MM2 upon which this migration is to be performed.

On receiving the configuration message CMD, the device T31 sends an ACTION command message to the devices T21 and T22 with which it is maintaining active BGP sessions. This command message comprises its new AS number 4200000002 along with the timestamp DD2:HH2:MM2.

Starting from the timestamp DD2:HH2:MM2, the new AS number 4200000002 is effectively included in the local configurations of the different devices T21, T22, and T31 of the communication system 1. Once the communication system 1 has stabilized following the execution of the migration of the AS number 65002 to 4200000002, the controller 2 may trigger a new migration consisting in replacing the AS number 65003 associated with the device T32 with the AS number 4200000003.

FIG. 8C represents the third and final migration step implemented by the controller; this step consists in the migration of the AS number 65003 to the AS number 420000003. The controller 2 sends to the device T32 associated with the AS number 65003 a configuration message CMD containing the AS number 4200000003 to which must be migrated the AS number 65003 and an indication of the timeout expiry DD3:HH3:MM3 upon which this migration is to be performed.

On receiving the configuration message CMD, the device T32 sends an ACTION command message to the devices T21 and T22 with which it is maintaining active BGP sessions. This command message comprises its new AS number 4200000003 as well as the timestamp DD3:HH3:MM3.

Starting from the timestamp DD3:HH3:MM3, the new AS number 4200000003 is effective in the local configurations of the different devices T21, T22, and T32 of the communication system 1.

A second strategy can be envisioned by the operator of the data center to migrate a plurality of AS numbers, consisting in conducting the simultaneous migration of the different AS numbers. In other words, the controller 2 indicates to the devices concerned by the migration the same timeout expiry to replace their AS numbers.

This second strategy is illustrated by FIG. 9.

In accordance with this second strategy, the controller 2 sends (simultaneously or otherwise) configuration messages CMD to the devices T21, T22, T31 and T32 comprising the respective AS numbers to which they must migrate (in other words with which they must replace the AS numbers with which they are associated) and one and the same timeout expiry upon which these migrations must be executed (in the envisioned example, one and the same timestamp DD:HH:MM).

On receiving the configuration message CMD addressed to it, the devices T21 and T22 send an ACTION message to the devices T31 and T32 containing their current AS number 65001, their new AS number 4200000001 and the timestamp DD:HH:MM of the execution of the replacement of their AS number.

Similarly, on receiving the configuration message CMD that is addressed to it, the device T31 sends an ACTION messages to the devices T21 and T22 containing its current AS number 65002, its new AS number 4200000002 and the timestamp DD:HH:MM of the execution of the replacement of its AS number.

Similarly, on receiving the configuration message CMD addressed to it, the device T32 sends an ACTION message to the devices T21 and T22 containing its current AS number 65003, its new AS number 4200000003 and the timestamp DD:HH:MM of the execution of the replacement of its AS number.

Starting from the timestamp DD:HH:MM, the new AS numbers 4200000001, 4200000002 and 4200000003 are effective in the local configurations of the different devices T21, T22, T31 and T32 of the communication system 1.

The example envisioned here by way of illustration has considered the migration of AS numbers due to a change in their format, and at the decision of the operator of the data center. However, as mentioned previously, other reasons may be envisioned for the migration of one or more AS numbers associated with devices of the communication system 1. Thus such a migration may for example result from the merging of autonomous systems (for example autonomous systems 65002 and 65003 in the example in FIG. 1), etc.

The invention claimed is:

1. A method for configuring a first network node, the method implemented by a first node and comprising:
    setting up, using a first autonomous system number, at least one session with another network node, said at least one session being compliant with a dynamic routing protocol implemented in the network, the knowledge of said first autonomous system number by said first node and said another network node being required to be able to set up and maintain active said at least one session with said another network node;
    receiving a configuration message comprising at least one item of information representing at least one second autonomous system number intended to be used on the network by the first node as a replacement for the first autonomous system number in active sessions and future sessions of the first node compliant with the dynamic routing protocol;
    configuring the first node with the at least one second autonomous system number for the first node to use the at least one second autonomous number on the network as a replacement for the first autonomous system number in its active sessions and future sessions compliant with the dynamic routing protocol;
    identifying at least one second network node having at least one session, compliant with the dynamic routing protocol, active with the first node, wherein the first node is associated with the first autonomous system number; and
    sending, to the at least one second node, a command message requesting the replacement by the at least one second node of the first autonomous system number associated with the first node with the at least one second autonomous system number, such that after the replacement the first node is associated with one said second autonomous system number in the at least one active session, said replacement enabling maintenance of said at least one session active between said first node and said at least one second node, without interrupting said at least one active session, by associating said second autonomous system number with said first node.

2. The method of claim 1 wherein, during the configuring of the first node with the at least one second autonomous system number, the first node is configured to immediately use on the network the at least one second autonomous system number.

3. The method of claim 1 wherein, during the configuring of the first node with the at least one second autonomous system number, the first node is configured to use on the network the at least one second autonomous system number in a deferred manner on detecting a predetermined event indicated in the configuration message.

4. The method of claim 3 wherein the command message comprises the indication of a timeout expiry to be observed by the at least one second node to replace the first autonomous system number associated with the first node with the at least one second autonomous system number.

5. The method of claim 1, wherein the at least one item of information representing the at least one second autonomous system number comprises:
    the at least one second autonomous system number; or
    at least one difference between the at least one second autonomous system number and the first autonomous system number.

6. A non-transitory, computer-readable storage medium having stored thereon instructions which, when executed by a processor, cause the processor to implement the method of claim 1.

7. A method for processing a command message requesting the replacement of a first autonomous system number associated with a first network node implementing a dynamic routing protocol, with at least one second autonomous system number, knowledge of said first autonomous system number by said first node and said another network node being required to be able to set-up and maintain active at least one session with another network node, the processing method implemented by a second network node and comprising:
    verifying if there exists:
        at least one active session between the first node and the second node compliant with the dynamic routing protocol and wherein the first node is associated with the first autonomous system number; and/or
        at least one entry associated with the first autonomous system number in at least one routing table kept by the second node for the implementation of the dynamic routing protocol in the network;

upon confirmation that at least one active session exists, replacing the first autonomous system number associated with the first node in the at least one active session and future sessions compliant with the dynamic routing protocol, with the at least one second autonomous system number, said replacement enabling maintenance of at least one session active between said first node and said second node, without interrupting at least one active session, by associating said second autonomous system number with said first node; and upon confirmation that there exists at least one entry in at least one routing table kept by the second node, replacing in the at least one routing table of the first autonomous system number associated with the at least one entry with the at least one second autonomous system number.

8. The method of claim 7, wherein the command message comprises the indication of a timeout expiry to be observed by the second node to replace the first autonomous system number with the at least one second autonomous system number, the replacement being scheduled to be executed upon the timeout expiry.

9. The method of claim 7, further comprising, upon confirmation that there exists at least one entry associated with the first autonomous system number in a routing table containing at least one route announced by the second node to at least one third network node neighboring the second node, a step of sending the command message to the at least one third node.

10. The method of claim 9 further comprising, when the command message received by the second node comprises a timeout period to be observed before applying the at least one second autonomous system number, decrementing, before sending the command message to the at least one third node, of the timeout period by a time of processing of the command message by the second node and a time of directing of the command message between the second node and the at least one third node.

11. A non-transitory, computer-readable storage medium having stored thereon instructions which, when executed by a processor, cause the processor to implement the method of claim 7.

12. A first node of a network, the first node comprising a processor, the first node configured to:
set up, using a first autonomous system number, at least one session set up with another network node, said at least one session being compliant with a dynamic routing protocol implemented in the network, the knowledge of said first autonomous system number by said first node and said another network node being required to be able to set up and maintain active said at least one session with said another network node;
receive a configuration message comprising at least one item of information representing at least one second autonomous system number intended to be used on the network by the first node as a replacement for the first autonomous system number in active sessions and future sessions of the first node compliant with the dynamic routing protocol;
configure the first node with the at least one second autonomous system number for the first node to use the at least one second autonomous number on the network as a replacement for the first autonomous system number in its active sessions and future sessions compliant with the dynamic routing protocol;
identify at least one second network node having at least one session compliant with the active dynamic routing protocol with the first node, wherein the first node is associated with the first autonomous system number; and send, to the at least one second node, a command message requesting the replacement by the at least one second node of the first autonomous system number associated with the first node with the at least one second autonomous system number, such that after the replacement, the first node is associated with the second autonomous system number in said at least one active session, said replacement enabling maintenance of said at least one session active between said first node and said at least one second node, without interrupting said at least one active session, by associating said second autonomous system number with said first node.

13. A second node of a network, configured to process a command message requesting the replacement of a first autonomous system number associated with a first network node implementing a dynamic routing protocol, with at least one second autonomous system number, knowledge of said first autonomous system number by said first node and said another network node being required to be able to set up and maintain active at least one session with another network node, the second node comprising a processor and configured to:
verify whether or not there exists:
at least one active session between the first node and the second node compliant with the dynamic routing protocol and wherein the first node is associated with the first autonomous system number; and/or
at least one entry associated with the first autonomous system number in at least one routing table kept by the second node for the implementation of the dynamic routing protocol in the network;
upon verification that at least one active session exists, replace the first autonomous system number associated with the first node in the at least one active session and future sessions compliant with the dynamic routing protocol, with the at least one second autonomous system number, said replacement enabling maintenance of said at least one active session active between said first node and said second node, without interrupting said at least one active session, by associating said second autonomous system number with said first node; and
upon verification that at least one entry exists in at least one routing table kept by the second node, replace in the at least one routing table the first autonomous system number associated with the at least one entry with the at least one second autonomous system number.

14. A communication system in a network implementing a dynamic routing protocol, the system comprising:
the first node of claim 12, configured with a first autonomous system number and able to receive a configuration message comprising at least one second autonomous system number intended to be used by the first node on the network, knowledge of said first autonomous system number by said first node and said another network node being required to be able to set up and maintain active at least one session with another network node; and
a second node, configured to process the command message requesting the replacement of the first autonomous system number associated with the first network node implementing a dynamic routing protocol, with the at least one second autonomous system number, the second node comprising a processor and configured to:

verify whether or not there exists:
- at least one active session between the first node and the second node compliant with the dynamic routing protocol and wherein the first node is associated with the first autonomous system number; and/or
- at least one entry associated with the first autonomous system number in at least one routing table kept by the second node for the implementation of the dynamic routing protocol in the network;

upon verification that at least one active session exists, replace the first autonomous system number associated with the first node in the at least one active session and future sessions complaint with the dynamic routing protocol, with the at least one second autonomous system number, said replacement enabling maintenance of said at least one active session active between said first node and said second node, without interrupting said at least one active session, by associating said second autonomous system number with said first node; and upon verification that at least one entry exists in at least one routing table kept by the second node, replace in the at least one routing table the first autonomous system number associated with the at least one entry with the at least one second autonomous system number.

15. The communication system of claim 14 comprising a controller and a plurality of the first nodes configured with the first autonomous system numbers, the controller being configured, when the separate first autonomous system numbers are to be replaced by second autonomous system numbers, to successively send to the first nodes configured with these separate first autonomous system numbers the configuration messages comprising the second autonomous system numbers, the controller being configured to await after sending a configuration message intended to replace a first autonomous system number to at least one first node configured with this first autonomous system number, the effective replacement of the first autonomous system number in the communication system before sending a configuration message intended to replace another first autonomous system number to at least one other first node configured with this other first autonomous system number.

16. The communication system according to claim 14 comprising a controller and a plurality of the first nodes configured with the first autonomous system numbers, the controller being configured, when the separate first autonomous system numbers associated with the first nodes are to be replaced by second autonomous system numbers, to include in the configuration messages sent to the first nodes an indication of one and the same timeout expiry to be observed for each of the first nodes to use within the network the second autonomous system numbers as a replacement for the first autonomous system numbers.

* * * * *